United States Patent
Noguchi et al.

(10) Patent No.: US 9,151,015 B2
(45) Date of Patent: Oct. 6, 2015

(54) CONSTRUCTION MACHINE

(71) Applicant: HITACHI CONSTRUCTION MACHINERY CO., LTD., Tokyo (JP)

(72) Inventors: Shuuhei Noguchi, Higashiomi (JP); Hajime Yoshida, Omihachiman (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/361,040

(22) PCT Filed: Dec. 7, 2012

(86) PCT No.: PCT/JP2012/081792
§ 371 (c)(1),
(2) Date: May 28, 2014

(87) PCT Pub. No.: WO2013/105372
PCT Pub. Date: Jul. 18, 2013

(65) Prior Publication Data
US 2014/0326529 A1   Nov. 6, 2014

(30) Foreign Application Priority Data
Jan. 13, 2012  (JP) ................................. 2012-004936

(51) Int. Cl.
*B60K 13/04*  (2006.01)
*E02F 9/08*  (2006.01)
(Continued)

(52) U.S. Cl.
CPC .............. *E02F 9/0866* (2013.01); *B01D 46/42* (2013.01); *B01D 53/944* (2013.01); *B01D 53/9495* (2013.01); *E02F 3/325* (2013.01); *E02F 9/2025* (2013.01); *E02F 9/2066* (2013.01); *E02F 9/2095* (2013.01); *E02F 9/268* (2013.01); *F01N 3/023* (2013.01); *F01N 9/002* (2013.01); *F01N 13/0097* (2014.06); *B01D 53/96* (2013.01);
(Continued)

(58) Field of Classification Search
USPC ....................................... 180/309, 304, 53.62
See application file for complete search history.

(56) References Cited

U.S. PATENT DOCUMENTS

2004/0159099 A1* 8/2004 Kuboshima et al. ............ 60/297
2005/0072140 A1* 4/2005 Taylor et al. .................... 60/295
(Continued)

FOREIGN PATENT DOCUMENTS

EP       1 741 885 A2    1/2007
EP       1 975 396 A1   10/2008
(Continued)

*Primary Examiner* — Hau Phan
(74) *Attorney, Agent, or Firm* — Mattingly & Malur, PC

(57) ABSTRACT

In an engine, an exhaust gas purifying device and a regeneration device, there are provided detectors for detecting working states thereof, such as a rotational sensor, a cooling water temperature sensor, an intake temperature sensor, exhaust gas temperature sensors, pressure sensors, and opening degree sensors. When a trouble occurs in any of the sensors other than the pressure sensors among them, a light degree of operation restrictions is performed for restricting a rotational speed of the engine while it can be determined that particulate matter is not excessively accumulated in a particulate matter removing filter from a detection value of the pressure sensors. On the other hand, when the particulate matter is excessively accumulated in the particulate matter removing filter or when any of the pressure sensors has a trouble, a heavy degree of the operation restrictions accompanied by a fuel injection quantity restriction of the engine is performed.

5 Claims, 5 Drawing Sheets

(51) Int. Cl.
*B01D 46/42* (2006.01)
*F01N 3/023* (2006.01)
*B01D 53/94* (2006.01)
*E02F 9/20* (2006.01)
*E02F 9/26* (2006.01)
*F01N 9/00* (2006.01)
*F01N 13/00* (2010.01)
*E02F 3/32* (2006.01)
*F02D 29/04* (2006.01)
*F02M 25/07* (2006.01)
*B01D 53/96* (2006.01)

(52) U.S. Cl.
CPC ....... *B01D 2258/012* (2013.01); *B01D 2279/30* (2013.01); *F01N 2240/36* (2013.01); *F01N 2550/04* (2013.01); *F01N 2560/06* (2013.01); *F01N 2560/08* (2013.01); *F01N 2560/14* (2013.01); *F01N 2590/08* (2013.01); *F02D 29/04* (2013.01); *F02M 25/0718* (2013.01); *Y02T 10/47* (2013.01)

(56) References Cited

U.S. PATENT DOCUMENTS

| | | | |
|---|---|---|---|
| 2007/0044547 | A1* | 3/2007 | Zhang ............................. 73/116 |
| 2009/0000604 | A1* | 1/2009 | Bond et al. .................... 123/548 |
| 2010/0058743 | A1 | 3/2010 | Tsukada et al. |
| 2011/0072782 | A1* | 3/2011 | Ozawa et al. ................... 60/273 |
| 2013/0006495 | A1* | 1/2013 | Tajima et al. .................. 701/102 |
| 2013/0167810 | A1* | 7/2013 | Roplekar et al. .............. 123/564 |

FOREIGN PATENT DOCUMENTS

| | | |
|---|---|---|
| JP | 2004-132358 A | 4/2004 |
| JP | 2006-322375 A | 11/2006 |
| JP | 2008-215535 A | 9/2008 |
| JP | 2009-91915 A | 4/2009 |
| JP | 2010-065577 A | 3/2010 |
| JP | 2011-236764 A | 11/2011 |

* cited by examiner

CONSTRUCTION MACHINE

TECHNICAL FIELD

The present invention relates to a construction machine that is provided with an exhaust gas purifying device suitable for removing harmful substances from an exhaust gas in a diesel engine, for example, or the like.

BACKGROUND ART

A construction machine such as a hydraulic excavator or a hydraulic crane is generally configured by an automotive lower travelling structure, an upper revolving structure mounted on the lower travelling structure to be capable of revolving thereon, and a working mechanism tiltably mounted on a front side of the upper revolving structure. The upper revolving structure mounts an engine on a rear portion in a revolving frame for operating a hydraulic pump, and mounts a cab, a fuel tank, a hydraulic oil tank and the like on a front side in the revolving frame.

Here, a diesel engine is generally used as an engine that is a prime mover of the construction machine. There are some cases where harmful substances such as particulate matter (PM) and nitrogen oxides (NOx) are contained in an exhaust gas delivered from such a diesel engine. Therefore, the construction machine is provided with an exhaust gas purifying device in an exhaust pipe forming an exhaust gas passage of the engine for purifying an exhaust gas therein.

The exhaust gas purifying device is configured by including an oxidation catalyst (for example, diesel oxidation catalyst, referred to as "DOC" for short) for oxidizing and removing nitrogen monoxides (NO), carbon monoxides (CO), hydrocarbon (HC) that are contained in an exhaust gas, and a particulate matter removing filter (for example, diesel particulate filter, referred to as "DPF" for short) that is arranged downstream side of the oxidation catalyst for trapping and removing particulate matter in the exhaust gas (Patent Document 1).

Incidentally, in the particulate matter removing filter, the particulate matter is accumulated therein following the trapping of the particulate matter, which might cause the filter to be clogged. Therefore, it is necessary to remove the particulate matter from the filter in a point where a predetermined amount of the particulate matter is trapped for regenerating the filter. This regeneration of the filter can be performed in such a manner that fuel injection for regeneration treatment, which is called "post injection", is performed to increase a temperature of an exhaust gas for burning the particulate matter that is accumulated in the filter.

On the other hand, when the regeneration treatment is executed in a point where the particulate matter is excessively accumulated in the filter, the temperature of the exhaust gas rises to be excessively high (a combustion temperature of the particulate matter is excessively high), which might possibly cause the filter to be melted and damaged. Therefore, the conventional art is configured such that a trapping amount of the particulate matter trapped in the filter is estimated, and, based thereon, the regeneration treatment is executed before the estimated trapping amount becomes excessively large (Patent Document 2 and Patent Document 3).

PRIOR ART DOCUMENT

Patent Document

Patent Document 1: Japanese Patent Laid-Open No. 2010-65577 A
Patent Document 2: Japanese Patent Laid-Open No. 2006-322375 A
Patent Document 3: Japanese Patent Laid-Open No. 2004-132358 A

SUMMARY OF THE INVENTION

Incidentally, the conventional art according to Patent Document 2 is configured such that when an abnormality is detected in regeneration-related devices, that is, devices such as a sensor used for estimation of a trapping amount of the particulate matter trapped in a filter, even if the abnormality is detected in any device, output of an engine is restricted. However, depending upon the device in which the abnormality is detected, there is a case where the engine can continue to operate or a case where it is desired to take measures for stopping the engine as soon as possible.

Therefore, according to the conventional art by Patent Document 2, for example, in a case where it is desired to take measures for stopping the engine, there is a possibly that the engine continues to operate. On the other hand, on the contrary, for example, the output of the engine is excessively restricted regardless of the filter still has a sufficient allowance of trapping the particulate matter, thus creating a possibility of being incapable of move a construction machine from a working site to a maintenance location.

It should be noted that, for preventing the engine from continuing to operate in a case where it is desired to take measures for stopping the engine, in a case where an abnormality is detected in a regeneration-related device, even if the abnormality is detected in any device, it is considered to stop the engine immediately. In this case, however, since there is a possibility of being incapable of move a construction machine from a working site, this measure is not desirable.

In view of the aforementioned problems in the conventional art, it is an object of the present invention is to provide a construction machine that can take necessary failsafe measures corresponding to a detector in which a trouble occurs.

(1) A construction machine according to the present invention comprises a vehicle body on which an operator gets; an engine that is mounted on the vehicle body; an exhaust gas purifying device that is provided in an exhaust side of the engine and traps particulate matter in an exhaust gas discharged from the engine by a filter; a regeneration device that burns the particulate matter trapped in the filter to execute regeneration treatment of the filter; a state detecting device formed of a plurality of kinds of detectors for detecting working states of the engine, the exhaust gas purifying device and the regeneration device; and a control device for performing control of the engine and the regeneration device based upon a detection value of each of the detectors forming the state detecting device.

In order to solve the above-described problem, the configuration adopted by the present invention is characterized in that the state detecting device includes differential pressure detectors for detecting a differential pressure that is a difference between a pressure in an inlet side and a pressure in an outlet side of the filter in the exhaust gas purifying device, and the control device comprises: a trouble determining unit configured to determine whether any of the differential pressure detectors forming the state detecting device has a trouble or a detector other than the differential pressure detectors has a trouble; an excessive accumulation determining unit configured to determine whether or not the particulate matter is excessively accumulated in the filter based upon the differential pressure detected by the differential pressure detectors in a case where it is determined that the detector other than the differential pressure detectors has the trouble by the trouble determining unit; and an operation restricting unit configured to, in a case where it is determined that the detector has the trouble by the trouble determining unit, and/or it is determined that the particulate matter is excessively accumulated in the filter by the excessive accumulation determining unit, alarm an operator of the trouble and/or restrict output of the engine.

With this arrangement, necessary failsafe measures can be taken corresponding to the detector in which the trouble occurs to improve reliability of the construction machine. That is, in a case where it is determined that the detector other than the differential pressure detectors has the trouble by the trouble determining unit, the excessive accumulation determining unit determines whether or not the particulate matter is excessively accumulated in the filter based upon the differential pressure detected by the differential pressure detectors. Therefore, while it is determined that the particulate matter is not excessively accumulated in the filter by the excessive accumulation determining unit, it is possible for the engine to continue to operate by performing a light degree of operation restrictions by the operation restricting unit. Thereby, in a case where the detector other than the differential pressure detectors has the trouble, it is possible to prevent the output of the engine from being excessively restricted, and the construction machine can be driven from a working site to a maintenance location to perform necessary repair, replacement and maintenance.

On the other hand, in a case where it is determined that any of the differential pressure detectors has the trouble by the trouble determining unit or in a case where it is determined that the particulate matter is excessively accumulated in the filter by the excessive accumulation determining unit, a heavy degree of operation restrictions is performed by the operation restricting unit, thereby making it possible to prevent the engine from being forcibly continuously operated. In this case, it is possible to move the construction machine from a working site by preventing the engine from stopping immediately. Thereby, necessary repair, replacement and maintenance can be performed in a state where the construction machine is moved from the working site.

(2) According to the present invention, the operation restricting unit performs a light degree of the operation restrictions in a case where it is determined that the detector other than the differential pressure detectors has a trouble by the trouble determining unit and in a case where it is determined that the particulate matter is not excessively accumulated in the filter by the excessive accumulation determining unit, and performs a heavy degree of operation restrictions heavier than the light degree of the operation restrictions in a case where it is determined that any of the differential pressure detectors has the trouble by the trouble determining unit or in a case where it is determined that the particulate matter is excessively accumulated in the filter by the excessive accumulation determining unit.

With this arrangement, in a case where it is determined that the detector other than the differential pressure detectors has the trouble and it is determined that the particulate matter is not excessively accumulated in the filter, the operation restriction is forced to stay in the light degree. On the other hand, in a case where it is determined that any of the differential pressure detectors has the trouble and it is determined that the particulate matter is excessively accumulated in the filter, a heavy degree of operation restrictions is performed, thus preventing excessive loads from being applied to the engine, the exhaust gas purifying device and the regeneration or the engine from being forcibly continuously operated.

(3) According to the present invention, the light degree of the operation restrictions alarms an operator of the trouble, and performs a rotational speed restriction of the engine, and the heavy degree of the operation restrictions alarms an operator of the trouble, and performs the rotational speed restriction of the engine and a fuel injection quantity restriction. With this arrangement, it is possible to suppress the output of the engine from being excessively restricted and prevent the engine from being forcibly continuously operated.

(4) According to the present invention, in a case where it is determined that any of the differential pressure detectors has the trouble by the trouble determining unit or in a case where it is determined that the particulate matter is excessively accumulated in the filter by the excessive accumulation determining unit, the operation restricting unit stops the engine when a preset predetermined time elapses. With this arrangement, appropriately setting the predetermined time until the engine stops enables the construction machine to move from the working site and simultaneously the engine not to be forcibly continuously operated.

(5) According to the present invention, the differential pressure detectors among the detectors forming the state detecting device comprise a pair of pressure sensors for detecting pressures in an inlet side and an outlet side of the filter, and a detector other than the differential pressure detectors among the detectors forming the state detecting device comprises at least one of a rotational sensor for detecting a rotational speed of the engine, a cooling water temperature sensor for detecting a temperature of cooling water of the engine, an intake temperature sensor for detecting a temperature of air sucked into the engine, an exhaust gas temperature sensor for detecting a temperature of an exhaust gas, and an opening degree sensor for detecting an opening degree of a throttle valve for throttling an intake or exhaust gas flow passage.

MODE FOR CARRYING OUT THE INVENTION

Figure 1:
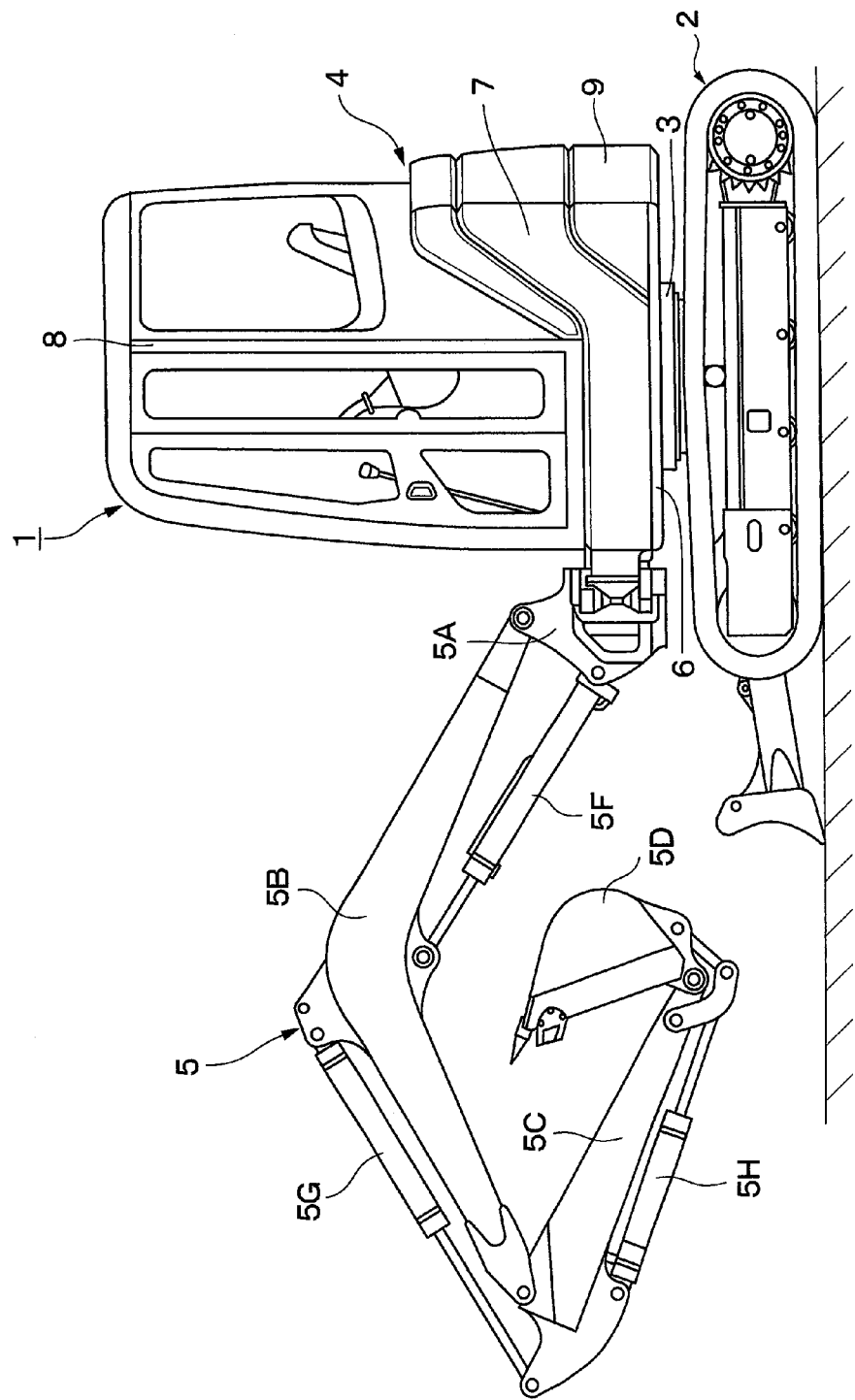
FIG. 1 is a front view showing a hydraulic excavator that is applied to the embodiment of the present invention.

Hereinafter, the embodiments of a construction machine according to the present invention will be in detail explained referring to the accompanying drawings by taking a case where the construction machine is applied to a small-sized hydraulic excavator called "mini excavator" as an example.

In the figure, designated at 1 is a small-sized hydraulic excavator used for an excavating work of sand and earth or the like. The hydraulic excavator 1 is configured schematically by a crawler type of automotive lower traveling structure 2, an upper revolving structure 4 that is mounted through a revolving device 3 on the lower traveling structure 2 to be capable of revolving thereon and configures a vehicle body together with the lower traveling structure 2, and a working mechanism 5 that is tiltably provided in a front side of the upper revolving structure 4.

Here, the working mechanism 5 is formed as a swing post type working mechanism, and is provided with, for example, a swing post 5A, a boom 5B, an arm 5C, a bucket 5D as a working tool, a swing cylinder 5E (See, FIG. 2) for swinging the working mechanism 5 in the left-right direction, a boom cylinder 5F, an arm cylinder 5G, a bucket cylinder 5H and the like. The upper revolving structure 4 is configured by a revolving frame 6, an exterior cover 7, a cab 8, and a counterweight 9 and the like which will be described later.

The revolving frame 6 forms part of a structure of the upper revolving structure 4 and the revolving frame 6 is mounted on the lower traveling structure 2 through the revolving device 3. The revolving frame 6 is provided with the counterweight 9 and an engine 10 in the rear portion side, which will be described later, and the cab 8 in the left front side which will be described later. The revolving frame 6 is provided with the exterior cover 7 that is positioned between the cab 8 and the counterweight 9, and this exterior cover 7 defines a space that accommodates the engine 10, a hydraulic pump 17, a heat exchanger 19, an exhaust gas purifying device 20 and the like, together with the revolving frame 6, the cab 8 and the counterweight 9.

The cab 8 is mounted in the left front side of the revolving frame 6, and the cab 8 defines therein an operator's room on which an operator gets. An operator's seat on which the operator is seated, various operational levers, an alarming device 40 which will be described later (See, FIG. 3) and the like are disposed inside the cab 8.

Figure 2:
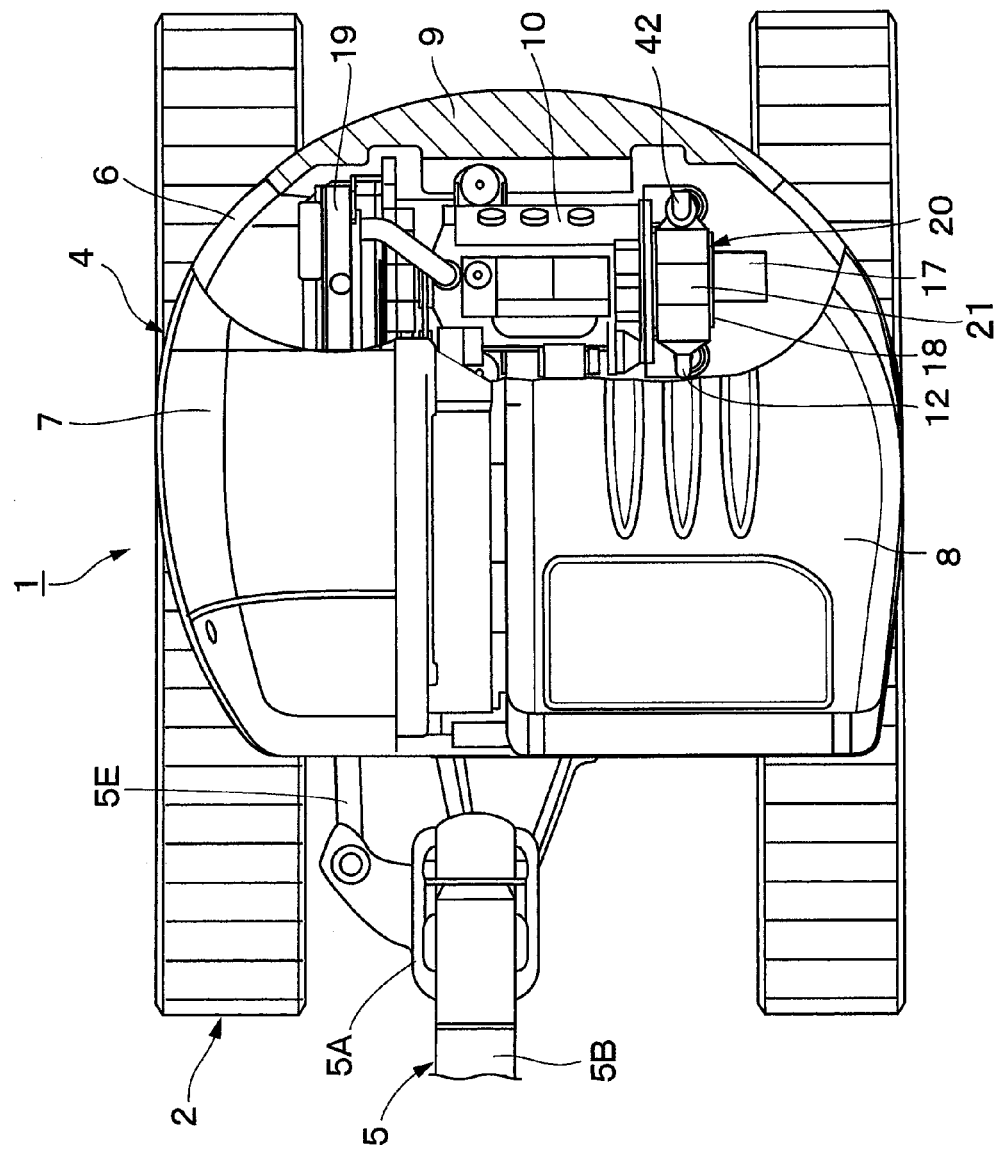
FIG. 2 is a partial cutaway plan view in which the hydraulic excavator is enlarged in a state where a cab and an exterior cover are partially removed from an upper revolving structure in FIG. 1.

The counterweight 9 acts as a weight balance to the working mechanism 5 and the counterweight 9 is mounted at the rear end portion of the revolving frame 6 to be positioned in the rear side of the engine 10 which will be described later. As shown in FIG. 2, the counterweight 9 is formed in a circular shape on the rear surface side to be accommodated within a vehicle width of the lower traveling structure 2.

Indicated at 10 is the engine mounted in the rear side of the revolving frame 6 in a transversely placed state and the engine 10 is mounted on the small-sized hydraulic excavator 1 as a prime mover, and is therefore configured by a small-sized diesel engine, for example. The engine 10 is provided with an intake pipe 11 for taking in outside air and an exhaust pipe 12 forming a part of an exhaust gas passage for discharging the exhaust gas. The exhaust gas purifying device 20 which will be described later is provided to be connected to the exhaust pipe 12.

Figure 3:
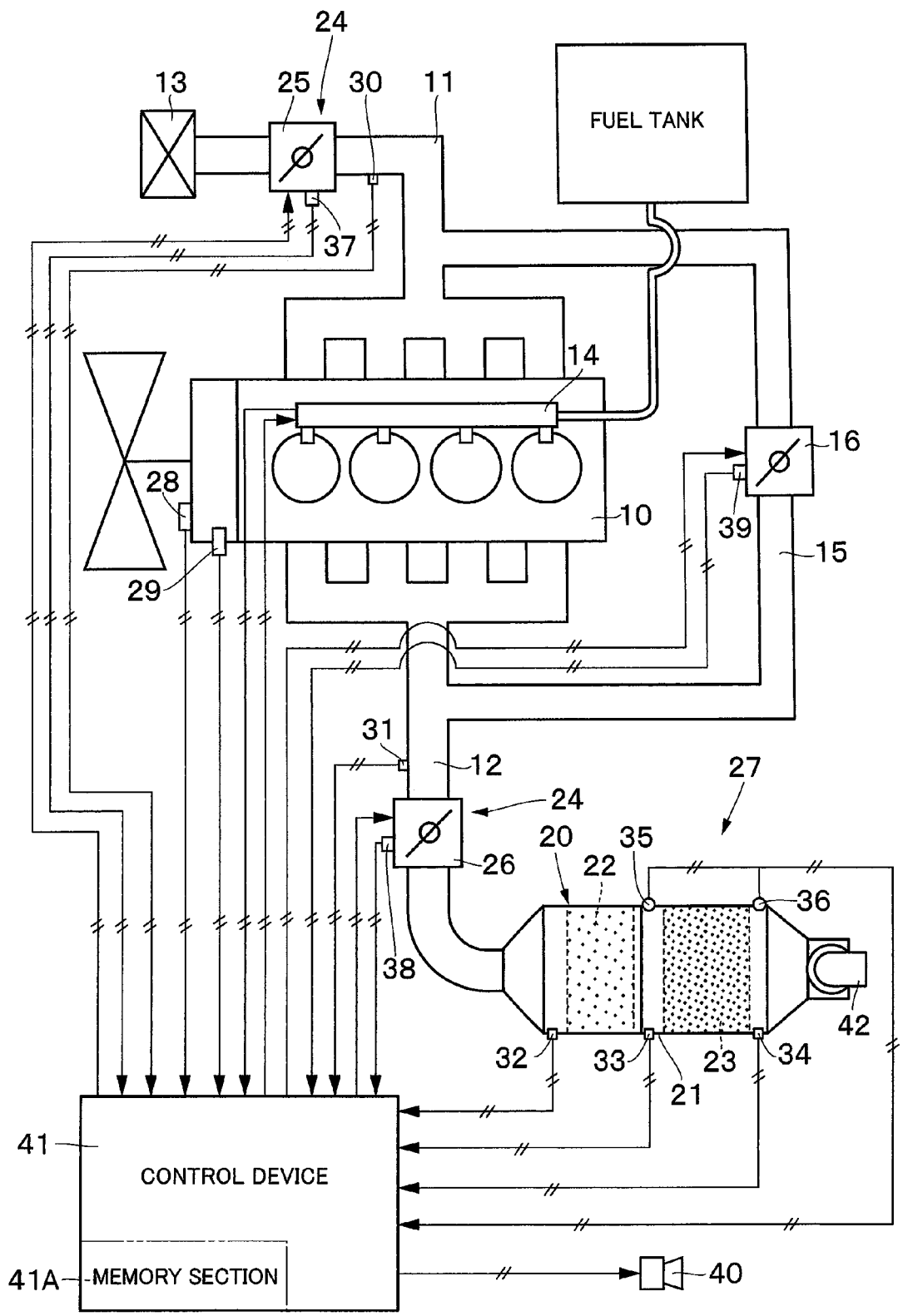
FIG. 3 is a configuration diagram showing an engine, an exhaust gas purifying device, a regeneration device, a control device, and a state detecting device.

As shown in FIG. 3, the intake pipe 11 is provided in an intake side of the engine 10, and a connecting portion in the intake pipe 11 to the engine 10 forms part of an intake manifold including a plurality of branch pipes. An air cleaner 13 is connected to a tip end side of the intake pipe 11 for purifying outside air, and an intake throttle valve 25 which will be described later is provided in the halfway of the intake pipe 11. The exhaust pipe 12 is provided in an exhaust side of the engine 10, and a connecting portion in the exhaust pipe 12 to the engine 10 forms part of an exhaust manifold including a plurality of branch pipes. An exhaust throttle valve 26 which will be described later is provided in the halfway of the exhaust pipe 12.

Here, the engine 10 is configured by an electronically controlled engine, and a supply quantity of fuel thereto is variably controlled by a fuel injection device 14 (See, FIG. 3) such as an electronically controlled injection valve. That is, the fuel injection device 14 variably controls an injection quantity of fuel (fuel injection quantity) injected into a cylinder (not shown) of the engine 10 based upon a control signal that is output from a control device 41 which will be described later.

Here, the fuel injection device 14 configures part of a regeneration device 24 which will be described later together with the intake throttle valve 25, the exhaust throttle valve 26 and the like. Specifically, the regeneration device 24 adjusts an opening degree of each of the intake throttle valve 25 and the exhaust throttle valve 26 in response to a control signal of the control device 41, and adjusts a fuel injection quantity into a cylinder by the fuel injection device 14 to increase a temperature of an exhaust gas to burn and remove particulate matter accumulated in a particulate matter removing filter 23 in the exhaust gas purifying device 20 which will be described later.

A recirculation pipe 15 is provided between the intake pipe 11 and the exhaust pipe 12, and the recirculation pipe 15 recirculates a part of an exhaust gas discharged into the exhaust pipe 12 from the engine 10 to the intake pipe 11. Here, an exhaust gas recirculation valve (EGR valve) 16 that opens/closes in response to a control signal from the control device 41 which will be described later is provided in the halfway section of the recirculation pipe 15. The exhaust gas recirculation valve 16 adjusts a recirculation quantity of an exhaust gas recirculated from the exhaust pipe 12 to the intake pipe 11, and recirculates a part of the exhaust gas to the intake side, which enables nitrogen oxides (NOx) in the exhaust gas to be reduced.

The hydraulic pump 17 is mounted to the left side of the engine 10. The hydraulic pump 17 forms part of a hydraulic source together with a hydraulic oil tank (not shown). The hydraulic pump 17 is configured by, for example, a swash plate type, bent axis type or radial piston type hydraulic pump of a variable displacement type. It should be noted that the hydraulic pump 17 is not necessarily limited to the hydraulic pump of a variable displacement type, but may be configured by using a hydraulic pump of a fixed displacement type.

As shown in FIG. 2, a power transmission device 18 is mounted to the left side of the engine 10, and rotational output of the engine 10 is transmitted through the power transmission device 18 to the hydraulic pump 17. The hydraulic pump 17 is driven by the engine 10 to deliver pressurized oil (hydraulic oil) toward a control valve (not shown).

The heat exchanger 19 is provided on the revolving frame 6 to be positioned to the right side of the engine 10. The heat exchanger 19 is configured by, for example, a radiator, an oil cooler, and an intercooler. That is, the heat exchanger 19 performs cooling of the engine 10, as well as cooling of pressurized oil (hydraulic oil) that is returned back to the hydraulic oil tank.

Next, explanation will be made of the exhaust gas purifying device 20 for purifying an exhaust gas discharged from the engine 10.

That is, designated at 20 is the exhaust gas purifying device that is provided in the exhaust side of the engine 10. As shown in FIG. 2, the exhaust gas purifying device 20 is arranged in the upper portion left side of the engine 10 in a position above the power transmission device 18, for example, and is connected at the upstream side to the exhaust pipe 12 of the engine 10. The exhaust gas purifying device 20 forms part of an exhaust gas passage together with the exhaust pipe 12 and removes harmful substances contained in an exhaust gas during a period where the exhaust gas flows from the upstream side to the downstream side of the exhaust gas passage. More specifically, particulate matter in the exhaust gas discharged from the engine 10 is trapped by the particulate matter removing filter 23.

That is, the engine 10 comprising a diesel engine has a high efficiency and is excellent in durability. However, harmful substances such as particulate matter (PM), nitrogen oxides (NOx), and carbon monoxides (CO) and the like are contained in the exhaust gas from the engine 10. Therefore, as shown in FIG. 3, the exhaust gas purifying device 20 mounted in the exhaust pipe 12 is configured to include an oxidation catalyst 22 for oxidizing and removing carbon monoxides (CO) or the like in the exhaust gas and the particulate matter removing filter 23, which will be described later, for trapping and removing particulate matter (PM) in the exhaust gas.

As shown in FIG. 3, the exhaust gas purifying device 20 is provided with a cylindrical casing 21 configured by removably connecting a plurality of cylinders before and after. The oxidation catalyst 22 and the particulate matter removing filter 23 as the filter are removably accommodated in the casing 21.

The oxidation catalyst 22 comprises a cell-shaped cylinder made of ceramic having an outer diameter dimension that is equivalent to an inner diameter dimension of the casing 21, for example. Many through holes (not shown) are axially formed in the oxidation catalyst 22, an inner surface of which is coated with noble metals. The oxidation catalyst 22 oxidizes and removes carbon monoxides (CO), hydrocarbon (HC) and the like contained in the exhaust gas, and removes nitrogen oxides (NO) as nitrogen dioxides ($NO_2$) by circulating an exhaust gas into each through hole under a predetermined temperature condition.

On the other hand, the particulate matter removing filter 23 is arranged in the casing 21 downstream of the oxidation catalyst 22. The particulate matter removing filter 23 traps particulate matter in the exhaust gas discharged from the engine 10, and burns and removes the trapped particulate matter to perform purification of the exhaust gas. Therefore, the particulate matter removing filter 23 is configured by a cell-shaped cylinder, for example, made of a ceramic material, which is a porous member having many small bores (not shown) in an axial direction. Thereby, the particulate matter removing filter 23 traps particulate matter through many small bores, and the trapped particulate matter is burned and removed by regeneration treatment of the regeneration device 24 which will be described later. As a result, the particulate matter removing filter 23 is regenerated.

Designated at 24 is the regeneration device for executing the regeneration treatment of the particulate matter removing filter 23 by burning the particulate matter trapped in the filter 23 and the regeneration device 24 is configured schematically by the intake throttle valve 25 and the exhaust throttle valve 26, which will be described later. The regeneration device 24 operates at least one of the intake throttle valve 25 and the exhaust throttle valve 26 in a direction of throttling a flow passage thereof in response to a command signal (control signal) of the control device 41 which will be described later, and adjusts a fuel injection quantity to a cylinder by the fuel injection device 14. Thereby, as described later, a temperature of an exhaust gas in the exhaust pipe 12 is increased to burn and remove the particulate matter accumulated in the particulate matter removing filter 23.

The intake throttle valve 25 is provided in the side of the intake pipe 11 of the engine 10, and the intake throttle valve 25 forms part of the regeneration device 24 for executing the regeneration treatment of the particulate matter removing filter 23. Here, the intake throttle valve 25 is regularly held in an opened state in response to a control signal from the control device 41 (for example, in an opening degree corresponding to a fuel injection quantity or in a fully opened state). On the other hand, at the time of executing the regeneration treatment, the intake throttle valve 25 is driven in the direction of throttling the flow passage by the control signal from the control device 41.

Thereby, the intake throttle valve 25 throttles an intake air quantity such that an air-fuel ratio of air and fuel becomes in a richer side. At this time, a temperature of an exhaust gas discharged to the side of the exhaust pipe 12 rises in a combustion chamber in the engine 10 by burning the fuel the air-fuel ratio of which has become in the richer side, thus making it possible to burn and remove the particulate matter trapped in the particulate matter removing filter 23.

The exhaust throttle valve 26 is provided in the side of the exhaust pipe 12 of the engine 10, and the exhaust throttle valve 26 also forms part of the regeneration device 24 for executing the regeneration treatment of the particulate matter removing filter 23. Here, the exhaust throttle valve 26 is regularly held in a fully opened state in response to a control signal from the control device 41. On the other hand, at the time of executing the regeneration treatment, the exhaust throttle valve 26 is operated in the direction of throttling the flow passage in response to the control signal from the control device 41 to perform control of throttling the opening degree to be smaller.

Thereby, the exhaust throttle valve 26 throttles a flow quantity of an exhaust gas flowing in the exhaust pipe 12 to apply a back pressure to the engine 10 and increase loads to the engine 10. At this time, the control device 41 increases a fuel injection quantity by the fuel injection device 14 of the engine 10 corresponding to the above-mentioned load. As a result, a temperature of the exhaust gas rises, thereby making it possible to burn and remove the particulate matter trapped in the particulate matter removing filter 23.

Designated at 27 is a state detecting device for detecting working states of the engine 10, the exhaust gas purifying device 20 and the regeneration device 24. The state detecting device 27 is configured by a plurality of detectors, specifically schematically by a rotational sensor 28, a cooling water temperature sensor 29, an intake temperature sensor 30, exhaust gas temperature sensors 31, 32, 33 and 34, pressure sensors 35 and 36, opening degree sensors 37, 38 and 39. In this case, among the respective detectors, the pressure sensors 35 and 36 correspond to differential pressure detectors, and the other sensors 28 to 34 and 37 to 39 correspond to detectors other than the differential pressure detectors. It should be noted that in the present embodiment, the state detecting device 27 is an example of a sensor (detector) provided in the small-sized hydraulic excavator 1. Therefore, the sensors 28 to 34 and 37 to 39 other than the pressure sensors 35 and 36 are mounted as needed depending upon the structure of the engine 10, the exhaust gas purifying device 20 or the like.

The rotational sensor 28 is a sensor provided for detecting rotational speeds of the engine 10, and the rotational sensor 28 detects a rotational speed of the engine 10 and outputs the detection signal to the control device 41 which will be described later. The control device 41 estimates a trapping amount of the particulate matter trapped in the particulate matter removing filter 23 based upon, for example, an engine rotational speed N detected by the rotational sensor 28, a fuel injection quantity F injected by the fuel injection device 14, and a temperature of an exhaust gas (exhaust temperature) before the oxidation catalyst 22 detected by the exhaust gas temperature sensor 32 which will be described later, and determines whether or not the regeneration treatment is executed based upon a first estimated trapping amount Q1 that is the estimated trapping amount. It should be noted that the fuel injection quantity F can be found from an intake air quantity detected from, for example, the air flow meter which is not shown provided in the intake side of the engine 10 and the engine rotational speed N, and besides, can be calculated also from a control signal (fuel injection command) that is output to the fuel injection device 14 from the control device 41, for example.

The cooling water temperature sensor 29 is a sensor provided for detecting a temperature (water temperature) of cooling water for the engine 10, and the cooling water temperature sensor 29 detects a temperature of engine cooling water and outputs the detection signal to the control device 41 which will be described later. The temperature of the engine cooling water is used for monitoring the working state of the engine 10, or used for control, calculation of a state quantity of the engine 10 or the regeneration device 24 as needed and the like.

The intake temperature sensor 30 is a sensor provided for detecting a temperature of intake air (intake temperature). As shown in FIG. 3, the intake temperature sensor 30 is mounted downstream of the intake throttle valve 25 in the halfway of the intake pipe 11, and detects a temperature of air sucked into the engine 10. The intake temperature detected by the intake temperature sensor 30 is output as a detection signal to the control device 41 which will be described later. The intake temperature is used for monitoring the working state of the engine 10, or used for control, calculation of a state quantity of the engine 10 or the regeneration device 24 as needed and the like. The exhaust gas temperature sensors 31, 32, 33 and 34 are sensors provided for detecting a temperature of an exhaust gas (exhaust temperature). As shown in FIG. 3, the front exhaust gas temperature sensor of throttle valve 31 among the exhaust gas temperature sensors 31, 32, 33 and 34 is mounted upstream of the exhaust throttle valve 26 in the halfway of the exhaust pipe 12. The front exhaust gas temperature sensor of catalyst 32 is mounted upstream of the oxidation catalyst 22 in the casing 21 of the exhaust gas purifying device 20. The front exhaust gas temperature sensor of filter 33 is mounted upstream of the particulate matter removing filter 23 in the casing 21 of the exhaust gas purifying device 20. The rear exhaust gas temperature sensor of filter 34 is mounted downstream of the particulate matter removing filter 23 in the casing 21 of the exhaust gas purifying device 20.

The front exhaust gas temperature sensor of throttle valve 31 detects a temperature of an exhaust gas upstream of the exhaust throttle valve 26. The front exhaust gas temperature sensor of catalyst 32 detects a temperature of an exhaust gas upstream of the oxidation catalyst 22. The front exhaust gas temperature sensor of filter 33 detects a temperature of an exhaust gas upstream of the particulate matter removing filter 23. The rear exhaust gas temperature sensor of filter 34 detects a temperature of an exhaust gas downstream of the particulate matter removing filter 23. The exhaust temperature detected by each of the exhaust gas temperature sensors 31, 32, 33 and 34 is output to the control device 41, which will be described later, as a detection signal. Each exhaust temperature is used for monitoring the working states of the engine 10, the exhaust gas purifying device 20 and the regeneration device 24 or, for example, for estimating a trapping amount of the particulate matter trapped in the particulate matter removing filter 23.

Indicated at 35 and 36 are pressure sensors as the differential pressure detectors provided in the casing 21 of the exhaust gas purifying device 20. As shown in FIG. 3, a pair of the pressure sensors 35 and 36 are arranged at an inlet side (upstream side) and at an outlet side (downstream side) of the particulate matter removing filter 23 to be spaced from each other, and output the respective detection signals to the control device 41 which will be described later. The control device 41 calculates a differential pressure ΔP by a pressure P1 in an inlet side detected by the pressure sensor 35 and a pressure P2 in an outlet side detected by the pressure sensor 36, for example. Along with it, the control device 41 estimates a trapping amount of the particulate matter trapped in the particulate matter removing filter 23 based upon the differential pressure ΔP, an exhaust temperature, and an exhaust gas flow amount, and determines whether or not the regeneration treatment is executed based upon a second estimated trapping amount Q2 that is the estimated trapping amount.

The opening degree sensors 37, 38 and 39 respectively detect opening states of throttle valves (intake throttle valve 25, exhaust throttle valve 26, exhaust gas recirculation valve 16) for throttling the flow passage of intake or exhaust. As shown in FIG. 3, the intake throttle valve opening degree sensor 37 among the respective opening degree sensors 37, 38 and 39 is mounted on the intake throttle valve 25 and detects an opening degree thereof. The exhaust throttle valve opening degree sensor 38 is mounted on the exhaust throttle valve 26 and detects an opening degree thereof. The exhaust gas recirculation valve opening degree sensor 39 is mounted on the exhaust gas recirculation valve 16 and detects an opening degree thereof. The opening degree detected by each of the opening degree sensors 37, 38 and 39 is output to the control device 41, which will be described later, as a detection signal. Each opening degree is used for monitoring the working states of the engine 10, the exhaust gas purifying device 20 and the regeneration device 24 or, for example, for estimating a trapping amount of the particulate matter trapped in the particulate matter removing filter 23, and the like.

The alarming device 40 is provided near an operator's seat in the cab 8. The alarming device 40 is connected to the control device 41 which will be described later, and notifies an operator that any of the sensors 28 to 39 forming the state detecting device 27 has a trouble, and that the operation restriction is performed corresponding to the trouble, based upon a command (alarm signal) from the control device 41. Here, the alarming device 40 may be configured by a buzzer for generating an alarm sound, a speaker for generating sounds, a light or monitor for displaying an alarm content or the like. The alarming device 40, in a case where the control device 41 determines that the detector of the state detecting device 27 has a trouble, notifies an operator of the occurrence of the trouble by generating an alarm sound or an alarm display based upon a command (alarm signal) from the control device 41.

Designated at 41 is the control device (control unit) that comprises a microcomputer and the like. The control device 41 performs control of the engine 10 and the regeneration device 24 based upon a detection value of each of the sensors 28 to 39 forming the state detecting device 27. Here, the control device 41 is connected at the input side to the fuel injection device 14, each detector of the state detecting device 27, that is, the rotational sensor 28, the cooling water temperature sensor 29, the intake temperature sensor 30, the exhaust gas temperature sensors 31, 32, 33 and 34, the pressure sensors 35 and 36, the opening degree sensors 37, 38 and 39, and the like. The control device 41 is connected at the output side to the fuel injection device 14, the intake throttle valve 25, the exhaust throttle valve 26, the exhaust gas recirculation valve 16, the alarming device 40, and the like. The control device 41 includes a memory section 41A comprising a ROM, a RAM and the like, and process programs for regeneration treatment and operation restrictions shown in FIG. 4 and FIG. 5 which will be described later, a first map, a second map, calculation formulas, a preset trapping amount threshold value Qs, a differential pressure threshold value $\Delta$Ps, a predetermined time Ts, and the like that are in advance produced for estimating a trapping amount of particulate matter are stored in the memory section 41A.

Here, the first map for estimating a trapping amount of the particulate matter trapped in the particulate matter removing filter 23 is a map for estimating the trapping amount based upon at least a rotational speed N of the engine 10 and the fuel injection quantity F. Specifically, the first map is a map that is produced based upon a corresponding relation between the engine rotational speed N, the fuel injection quantity F, and an emission amount Hm of particulate matter, which is in advance found by experiments and the like. The calculation formula for estimating the trapping amount can be expressed according to the following formula 1 in a case where an estimated trapping amount is indicated at Q1, an emission amount of the particulate matter found by the first map is indicated at Hm and an amount (regeneration amount) of particulate matter removed from the particulate matter removing filter 23 by the regeneration treatment is indicated at J.

$$Q1=Hm-J \quad \text{[Formula 1]}$$

In this case, the amount of the particulate matter removed from the regeneration treatment, that is, the regeneration amount J can be calculated from, for example, a relation between a flow amount of an exhaust gas found by the engine rotational speed N and the fuel injection quantity F, an exhaust temperature before the oxidation catalyst 22, and a $NO_2$ conversion rate found by adding an exhaust temperature to an emission amount of nitrogen oxides (NOx) found by the engine rotational speed N and the fuel injection quantity F.

The second map for estimating a trapping amount of particulate matter trapped in the particulate matter removing filter 23 is a map for estimating the trapping amount based upon at least the differential pressure $\Delta$P across the particulate matter removing filter 23. Specifically, the second map is a map that is produced based upon, for example, a corresponding relation between the differential pressure $\Delta$P, an exhaust gas flow amount, and the estimated trapping amount Q2, which is in advance found by experiments and the like. The differential pressure $\Delta$P across the particulate matter removing filter 23 can be expressed according to the following formula 2 in a case where a pressure in an inlet side detected by the pressure sensor 35 is indicated at P1 and a pressure in an outlet side detected by the pressure sensor 36 is indicated at P2 (See, Patent Document 3).

$$\Delta P=P1-P2 \quad \text{[Formula 2]}$$

The trapping amount threshold value Qs is a reference value for determining whether or not the regeneration treatment is executed. That is, the trapping amount threshold value Qs is a threshold value for determining that the regeneration treatment is necessary when at least one of the first estimated trapping amount Q1 estimated by the first map and the calculation formula and the second estimated trapping amount Q2 estimated by the second map is equal to or more than the trapping amount threshold value Qs. A value of the trapping amount threshold value Qs is in advance set based upon experiments, calculations, simulations and the like so that the regeneration treatment can be executed in an appropriate state, for example, in a state where a sufficient quantity of the particulate matter is trapped in the particulate matter removing filter 23.

The differential pressure threshold value $\Delta$Ps is a reference value for determining whether or not particulate matter is excessively accumulated in the particulate matter removing filter 23. That is, the differential pressure threshold value $\Delta$Ps is a value for determining that the particulate matter is excessively accumulated in the particulate matter removing filter 23 when the differential pressure $\Delta$P exceeds the differential pressure threshold value $\Delta$Ps. A value of the differential pressure threshold value $\Delta$Ps is in advance set based upon experiments, calculations, simulations and the like so that it can be appropriately determined whether or not the particulate matter is excessively accumulated, for example, so that it is not determined that the particulate matter is excessively accumulated regardless of the filter having a sufficient allowance for trapping the particulate matter in the filter 23.

The predetermined time Ts is a time from a point when occurrence of a malfunction is determined until a point when the engine 10 is stopped. Specifically, in a case where it is determined that the pressure sensor 35 or 36 has a trouble or in a case where it is determined that a sensor other than the pressure sensors 35 and 36 has a trouble and it is determined that the particulate matter is excessively accumulated in the particulate matter removing filter 23, the predetermined time Ts is a time from a point when the determination is made until a point when the engine 10 is stopped. The predetermined time Ts is in advance set based upon experiments, calculations, simulations and the like so that, in a case where the trouble occurs, it is possible to ensure the time for moving the hydraulic excavator 1 from a working site and it is possible to prevent the excessive malfunction due to continuation of the engine operation.

The control device 41 performs automatic regeneration control (first function) for automatically executing regeneration treatment, and, in a case where it is determined that troubles occur in any of the sensors 28 to 39 forming the state detecting device 27, performs driving restriction control (second function) for performing driving restrictions corresponding to the trouble, according to process programs in FIG. 4 and FIG. 5 which will be described later.

First, description will be made of the automatic regeneration control that is the first function. The control device 41 estimates a trapping amount of particulate matter trapped in the particulate matter removing filter 23 based upon at least the fuel injection quantity F and the engine rotational speed N, and in addition thereto, also based upon at least the differential pressure $\Delta$P across the particulate matter removing filter 23. Next, the control device 41 determines whether or not it is necessary to execute the regeneration treatment based upon at least one of the two estimated trapping amounts, that is, a first estimated trapping amount Q1 estimated based upon at least the fuel injection quantity F and the engine rotational speed N, and a second estimated trapping amount Q2 based upon at least the differential pressure $\Delta$P across the particulate matter removing filter 23 is equal to or more than a trapping amount threshold value Qs. Next, the control device 41 performs control of the automatic regeneration by outputting a control signal of performing regeneration to the regeneration device 24 when it is determined that the regeneration treatment is necessary. Specifically, the particulate matter accumulated in the particulate matter removing filter 23 is burned and removed by operating at least one of the intake throttle valve 25 and the exhaust throttle valve 26 in a direction of throttling a flow passage thereof, and by adjusting a fuel injection quantity to a cylinder by the fuel injection device 14.

Next, description will be made of the driving restriction control that is the second function. The control device 41 determines whether or not troubles such as malfunctions, abnormalities, miss operations, and failures are in the sensors 28 to 39 forming the state detecting device 27. Next, in a case where it is determined that troubles occur in at least one of the sensors 28 to 39 forming the state detecting device 27, the control device 41 determines whether the trouble is in any of the pressure sensor 35 or 36 or the trouble is in any of the sensors 28 to 34 and 37 to 39 other than the pressure sensors 35 and 36. Next, in a case where it is determined the trouble is in the sensor other than the pressure sensors 35 and 36, the control device 41 determines whether or not particulate matter is excessively accumulated in the particulate matter removing filter 23 based upon the differential pressure ΔP detected by the pressure sensors 35 and 36.

Further, the control device 41 performs the operation restrictions corresponding to the trouble of any of the sensors 28 to 39 and whether or not the particulate matter is excessively accumulated in the particulate matter removing filter 23. Specifically, in a case where it is determined that the trouble is in any of the sensors 28 to 39 and in a case where it is determined that the particulate matter is excessively accumulated in the particulate matter removing filter 23, the control device 41 gives an operator an alarm that there is the trouble and that the particulate matter is excessively accumulated. In this case, the control device 41 outputs a signal for outputting the alarm (alarm signal) to the alarming device 40, thereby generating an alarm sound and an alarm display from the alarming device 40 to perform a trouble alarm. Along with it, the control device 41 performs a rotational speed restriction or a restriction of output of the engine 10 such as a fuel injection quantity restriction. For example, the control device 41 outputs a control signal to the fuel injection device 14 of the engine 10 such that the engine rotational speed N or the fuel injection quantity F becomes smaller than in a case where no trouble is in the sensors 28 to 39.

It should be noted that a outlet port 42 is provided downstream of the exhaust gas purifying device 20, and the outlet port 42 is connected to an outlet side of the casing 21 to be positioned downstream of the particulate matter removing filter 23. The outlet port 42 is configured by including, for example, a chimney pipe for releasing an exhaust gas subjected to purifying treatment to an atmosphere, and a muffler.

The hydraulic excavator 1 according to the present embodiment has the configuration as described above, and, next, an operation thereof will be explained.

An operator of the hydraulic excavator 1 gets on the cab 8 of the upper revolving structure 4, and starts the engine 10 to drive the hydraulic pump 17. Thereby, pressurized oil from the hydraulic pump 17 is supplied through a control valve to various actuators. When the operator having got on the cab 8 operates an operating lever for traveling, the lower traveling structure 2 can go forward or backward.

On the other hand, when the operator in the cab 8 operates an operating lever for working, the working mechanism 5 can be tilted to perform an excavating work of sand and earth or the like. In this case, since a revolving radius by the upper revolving structure 4 is small, the small-sized hydraulic excavator 1 can perform a gutter digging work while revolving the upper revolving structure 4 even in a narrow working site such as an urban area.

At the operating of the engine 10, the particulate matter that are harmful substances is discharged from the exhaust pipe 12. At this time, the exhaust gas purifying device 20 can oxidize and remove hydrocarbon (HC), nitrogen oxides (NO), and carbon monoxides (CO) in an exhaust gas by the oxidation catalyst 22. The particulate matter removing filter 23 traps the particulate matter contained in the exhaust gas. Thereby, the purified exhaust gas can be discharged through the downstream outlet port 42 to an outside. Further, the trapped particulate matter is burned and removed (is subjected to regeneration treatment) by the regeneration device 24.

Incidentally, there are some cases where troubles such as malfunctions, abnormalities, miss operations, and failures occur in any of the sensors 28 to 39 forming the state detecting device 27. In this case, depending on the degree of the trouble, there is a case where the engine 10 can continue to operate or it is preferable to take measures for stopping the engine 10. For example, when the engine 10 continues to operate regardless of it is preferable to take measures for stopping the engine 10, it possibly leads to a larger trouble. On the contrary, for example, it is not preferable to stop the engine 10 immediately regardless of the particulate matter removing filter 23 still has a sufficient allowance of trapping particulate matter.

Therefore, in the present embodiment, the control device 41 performs the control of the regeneration treatment, and further, determines the trouble in the sensors 28 to 39 forming the state detecting device 27. In addition, the control device 41 can take a necessary failsafe measure corresponding to any of the sensors 28 to 39 in which the trouble has occurred. Specifically, the processes shown in FIG. 4 and FIG. 5 are executed by the control device 41 to execute the regeneration treatment and the operation restriction process.

Figure 4:
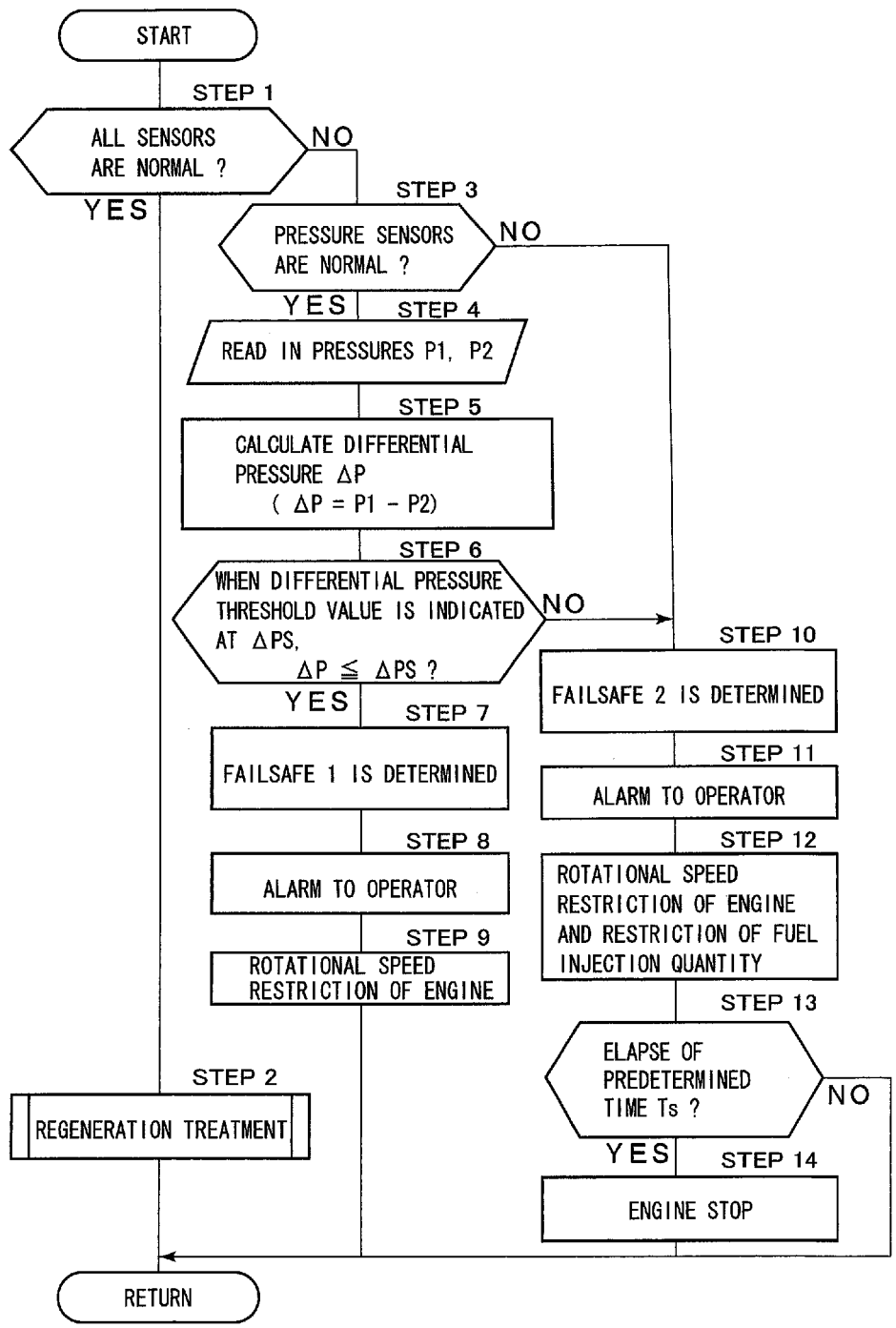
FIG. 4 is a flow chart showing a control content by the control device in FIG. 3.
Figure 5:
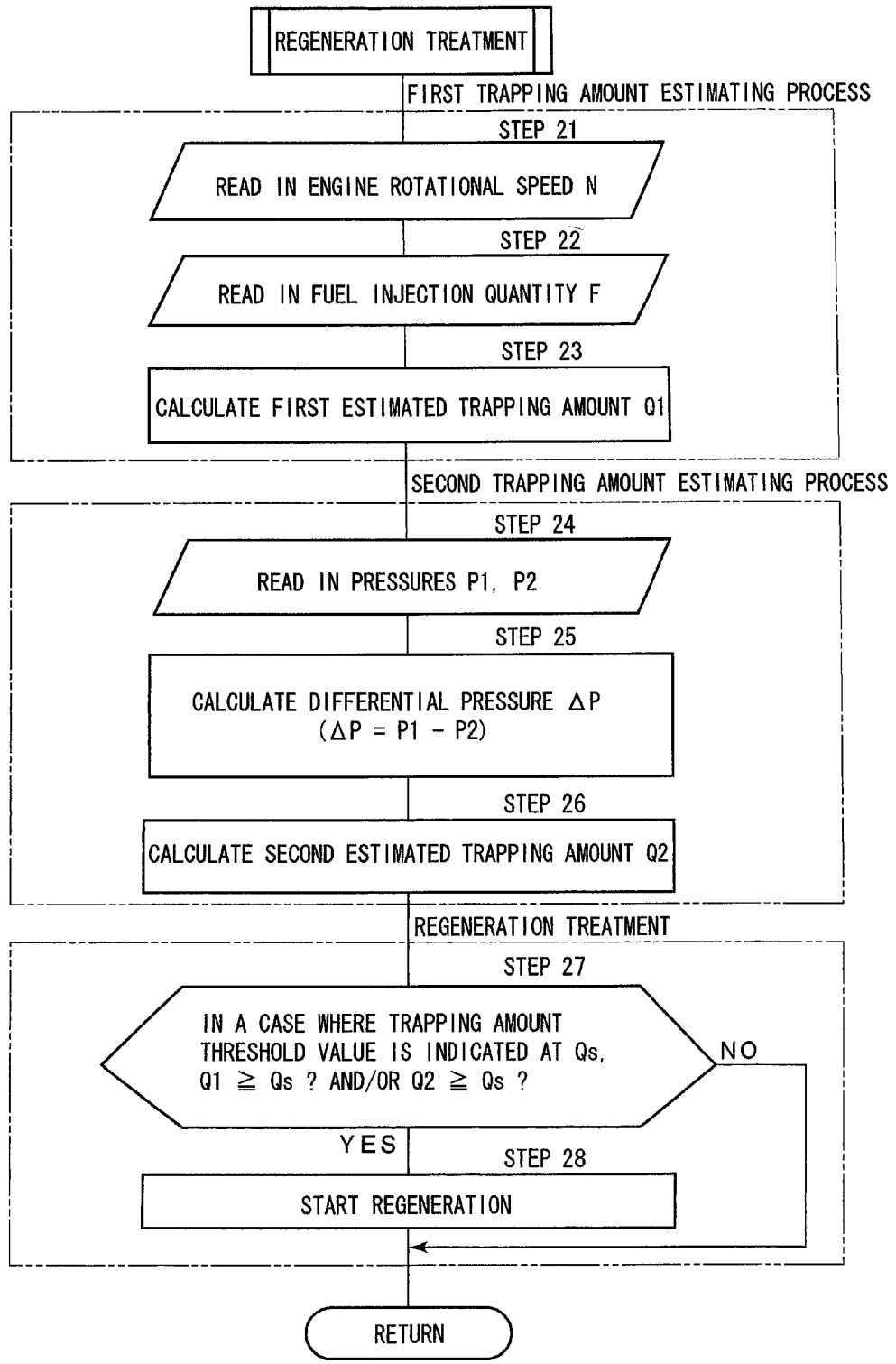
FIG. 5 is a flow chart showing regeneration treatment in FIG. 4.

When the process operation in FIG. 4 starts by a start (a work) of the engine 10, at step 1, it is determined whether or not the sensors 28 to 39 forming the state detecting device 27 are normal, that is, whether or not troubles such as abnormalities, miss operations, and failures occur in any of the sensors 28 to 39. This determination can be made (self-diagnosis), for example, in a case of outputting a predetermined driving state signal or a predetermined signal (self check signal), whether or not a predetermined detection result can be obtained from each of the sensors 28 to 39. In a case where at this step 1 it is determined that a determination of "YES" is made, that is, it is determined that all the sensors 28 to 39 forming the state detecting device 27 are normal (all the sensors 28 to 39 have no trouble), since it is not necessary to execute the operation restriction process, the routine goes to regeneration treatment at step 2.

At step 2 an amount of the particulate matter trapped in the particulate matter removing filter 23 is estimated and the regeneration treatment is automatically executed corresponding to the estimated trapping amount. This malfunction determining process, as shown in FIG. 5, performs control of the automatic regeneration in such a manner that it is determined whether or not the regeneration treatment is necessary from a first estimated trapping amount Q1 and a second estimated trapping amount Q2, and when it is determined that the regeneration treatment is necessary, a control signal of performing the regeneration is output to the regeneration device 24.

First, description will be made of the estimation process of the first estimated trapping amount Q1. That is, at step 21 of the regeneration treatment the engine rotational speed N is read in from the rotational sensor 28. Next, at step 22 the fuel injection quantity F is read in. The fuel injection quantity F can be found by, for example, an intake air quantity detected from the air flow meter which is not shown is provided in the intake side of the engine 10 and the engine rotational speed N, and besides, can also be calculated from, for example, a control signal (fuel injection command) that is output to the fuel injection device 14 from the control device 41.

At step 23 a trapping amount of particulate matter trapped in the particulate matter removing filter 23, that is, the first estimated trapping amount Q1 is estimated (calculated) based upon the engine rotational speed N and the fuel injection quantity F read at above steps 21 and 22. The first estimated trapping amount Q1 can be estimated using the first map and the calculation formula stored in the memory section 41A in the control device 41.

That is, a discharge amount per unit time is found using the aforementioned first map from the engine rotational speed N and the fuel injection quantity F, and a total discharge quantity Hm from the operating start to the present time is found by integrating the discharge amounts. The first estimated trapping amount Q1 at the present time can be estimated by subtracting an amount (regeneration amount) J of particulate matter that has been removed by the regeneration treatment until the present time from the total discharge amount Hm based upon the aforementioned formula 1.

Next, description will be made of the estimation process of the second estimated trapping amount Q2. At next step 24 pressures P1 and P2 are respectively read in from the pressure sensors 35 and 36. That is, the upstream pressure P1 and the downstream pressure P2 across the particulate matter removing filter 23 are read in. At next step 25 the differential pressure $\Delta P$ between the upstream pressure P1 and the downstream pressure P2 across the particulate matter removing filter 23 is calculated from the aforementioned formula 2.

At next step 26 a trapping amount of particulate matter trapped in the particulate matter removing filter 23, that is, the second estimated trapping amount Q2 is estimated (calculated) based upon the differential pressure $\Delta P$. The second estimated trapping amount Q2 can be estimated using the aforementioned second map stored in the memory section 41A in the control device 41. That is, the second estimated trapping amount Q2 at the present time can be estimated based upon the second map in which the differential pressure $\Delta P$, the exhaust gas flow amount and the estimated trapping amount Q2 are associated with each other.

When at step 23 the first estimated trapping amount Q1 is estimated and at step 26 the second estimated trapping amount Q2 is estimated, at next step 27 a determination, on whether or not the regeneration treatment is executed, is made based upon whether or not the first estimated trapping amount Q1 and/or the second estimated trapping amount Q2 is equal to or more than a preset trapping amount threshold value Qs. In a case where at step 27, the determination of "YES" is made, that is, it is determined that at least one of the first estimated trapping amount Q1 and the second estimated trapping amount Q2 is equal to or more than the trapping amount threshold value Qs, the particulate matter is sufficiently trapped in the particulate matter removing filter 23. Therefore, the routine goes to step 28, wherein the automatic regeneration starts.

That is, at step 28, for example, the control device 41 outputs a control signal for operating at least one of the intake throttle valve 25 and the exhaust throttle valve 26 in a closing direction (in a direction of throttling the flow passage), and outputs a control signal for increasing a fuel injection quantity to the fuel injection device 14. This control signal increases a temperature of an exhaust gas delivered from the engine 10 to burn and remove the particulate matter trapped in the particulate matter removing filter 23. In addition, the routine returns back to "Start" in FIG. 4 through "Start" in FIG. 5 and "Start" in FIG. 4, therefore, the steps beginning with the step 1 are repeated.

On the contrary, in a case where at step 27 the determination of "NO" is made, that is, it is determined that both of the first estimated trapping amount Q1 and the second estimated trapping amount Q2 are smaller than the trapping amount threshold value Qs, the particulate matter is not sufficiently trapped in the particulate matter removing filter 23. Therefore, the routine goes to "Return", not through step 28. The routine returns back to "Start" in FIG. 4 through "Start" in FIG. 5 and "Start" in FIG. 4, therefore, the steps beginning with the step 1 are repeated.

On the other hand, the routine goes back to FIG. 4, and in a case where at step 1 the determination of "NO" is made, that is, it is determined that not all the sensors 28 to 39 forming the state detecting device 27 are normal (at least one of the sensors 28 to 39 has a trouble), since it is necessary to execute the operation restriction process, the routine goes to step 3.

At step 3 it is determined whether or not the pressure sensors 35 and 36 are normal. This determination can also be made by self-diagnosis. In a case where at step 3 the determination of "YES" is made, that is, it is determined that the pressure sensors 35 and 36 are normal (the pressure sensors 35 and 36 have no trouble), since it is possible to determine whether or not the particulate matter is excessively accumulated in the particulate matter removing filter 23 by using the pressure sensors 35 and 36, the routine goes to step 4, wherein pressures P1 and P2 are respectively read in from the pressure sensors 35 and 36. That is, the upstream pressure P1 and the downstream pressure P2 across the particulate matter removing filter 23 are read in. At next step 5 the differential pressure $\Delta P$ between the upstream pressure P1 and the downstream pressure P2 across the particulate matter removing filter 23 is calculated from the aforementioned formula 2.

At next step 6 it is determined whether or not particulate matter is excessively accumulated in the particulate matter removing filter 23 based upon whether or not the differential pressure $\Delta P$ exceeds the differential pressure threshold value $\Delta Ps$. That is, in a case where the differential pressure $\Delta P$ is equal to or less than the differential pressure threshold value $\Delta Ps$, it is determined that the particulate matter is not excessively accumulated in the particulate matter removing filter 23 (the filter 23 has an allowance of trapping the particulate matter). On the other hand, in a case where the differential pressure $\Delta P$ exceeds the preset differential pressure threshold value $\Delta Ps$, it is determined that the particulate matter is excessively accumulated in the particulate matter removing filter 23 (the filter 23 has no allowance of trapping the particulate matter).

In a case where at step 6 the determination of "YES" is made, that is, it is determined that the particulate matter is not excessively accumulated in the particulate matter removing filter 23, the routine goes to step 7 wherein a failsafe 1 is determined. That is, in a case where it is determined that at step 3 the determination of "YES" is made and it is determined that at step 6 the determination of "YES" is made, since any of the sensors 28 to 34 and 37 to 39 other than the pressure sensors 35 and 36 has a trouble and the particulate matter is not excessively accumulated in the particulate matter removing filter 23. Therefore, the operation restriction of the failsafe 1 that is a light degree of the operation restrictions is performed.

Specifically, at next step 8 an alarm that any of the sensors 28 to 34 and 37 to 39 other than the pressure sensors 35 and 36 has the trouble is notified to an operator. That is, the control device 41 outputs an alarm signal for generating an alarm sound, an alarm display or the like to the alarming device 40 to alarm the operator that any of the sensors 28 to 34 and 37 to 39 other than the pressure sensors 35 and 36 has the trouble.

At next step 9 a rotational speed restriction of the engine 10 is performed. That is, in a case where any of the sensors 28 to 34 and 37 to 39 other than the pressure sensors 35 and 36 has a trouble, the rotational speed of the engine 10 is restricted, for example, such that the hydraulic excavator 1 can continue to travel from a working site to a maintenance location while it can be determined that the particulate matter is not excessively accumulated in the particulate matter removing filter 23 from the detection result of the pressure sensors 35 and 36. When at step 10 the rotational speed restriction of the engine 10 is performed, the routine goes back to "Start", and the steps beginning with the step 1 are repeated.

On the other hand, in a case where at step 3 the determination of "NO" is made, that is, it is determined that the pressure sensor 35 or 36 is not normal (the pressure sensor 35 or 36 has the trouble), or in a case where at step 6 the determination of "NO" is made, that is, it is determined that the particulate matter is excessively accumulated in the particulate matter removing filter 23, the routine goes to step 10, wherein a failsafe 2 is determined.

Specifically, the first, a case where at step 3 the determination of "NO" is made is a state where the pressure sensor 35 or 36 has the trouble, and it is not possible to determine whether or not the particulate matter is excessively accumulated in the particulate matter removing filter 23 by the pressure sensors 35 and 36. The second, a case where at step 6 the determination of "NO" is made is a state where the pressure sensors 35 and 36 are normal, but any of the sensors 28 to 34 and 37 to 39 other than the pressure sensors 35 and 36 has the trouble and the particulate matter is excessively accumulated in the particulate matter removing filter 23. Therefore, in the above two cases, there is performed the operation restriction of the failsafe 2 that is a heavy degree of the operation restrictions heavier than the light degree of the operation restrictions of the aforementioned failsafe 1.

At step 11, the alarm that the sensor 35 or 36 has the trouble or the particulate matter is excessively accumulated in the particulate matter removing filter 23 is notify to an operator. That is, the control device 41 outputs an alarm signal for generating an alarm sound, an alarm display or the like to the alarming device 40 to give the operator the notification that the sensor 35 or 36 has the trouble or the particulate matter is excessively accumulated in the particulate matter removing filter 23 (alarm of excessive accumulation).

Next, at subsequent step 12, the rotational speed restriction of the engine 10 and the fuel injection quantity restriction are performed. That is, the event that the routine goes to step 12 means, the first, a case where the sensor 35 or 36 has a trouble, or the second, a case where the sensors 35 and 36 have no trouble, but any of the sensors 28 to 34 and 37 to 39 other than the pressure sensors 35 and 36 has a trouble and the particulate matter is excessively accumulated in the particulate matter removing filter 23. Therefore, at step 12 the rotational speed restriction of the engine 10 and the fuel injection quantity restriction are performed in such a manner as to prevent excessive loads from being applied to the engine 10, the exhaust gas purifying device 20 and the regeneration device 24 or the engine from being forcibly continuously operated. When at step 11 the alarm is output to the operator and at step 12 the rotational speed restriction of the engine 10 and the fuel injection quantity restriction are performed, the routine goes to step 13, wherein it is determined whether or not a preset predetermined time Ts elapses. That is, it is determined whether or not an elapse time from a point where at step 3 the sensor 35 or 36 is not normal or from a point where at step 6 the particulate matter is excessively accumulated in the particulate matter removing filter 23 exceeds the predetermined time Ts. In a case where at step 13 the determination of "YES" is made, that is, it is determined that the elapse time exceeds the preset predetermined time Ts, the routine goes to step 14, wherein the engine 10 is stopped. That is, since the further continuation of the engine operation is not desirable, the engine 10 is stopped.

On the other hand, in a case where at step 13 the determination of "NO" is made, that is, it is determined that the preset predetermined time Ts does not elapse, for example, for ensuring the time of moving, the hydraulic excavator 1 from a working site, the routine goes to "Return", not through step 14, goes back to "Start" and the steps beginning with the step 1 are repeated.

Thus, according to the present embodiment, it is possible to take a necessary failsafe measure corresponding to any of the sensors 28 to 39 in which the trouble has occurred to improve reliability of the hydraulic excavator 1.

That is, in a case where by the processes of step 1 and step 3, it is determined that the sensor 35 and 36 are normal, but any of the sensors 28 to 34 and 37 to 39 other than the pressure sensors 35 and 36 has the trouble, it is determined whether or not the particulate matter is excessively accumulated in the particulate matter removing filter 23 based upon the differential pressure $\Delta P$ detected by the pressure sensors 35 and 36 by the process of step 6. Therefore, the light degree of the operation restrictions (engine rotational speed restriction) is performed by the processes of step 8 and step 9 while it can be determined that the particulate matter is not excessively accumulated in the particulate matter removing filter 23 by step 6, which allows the engine 10 to continue to operate. As a result, in a case where any of the sensors 28 to 34 and 37 to 39 other than the pressure sensors 35 and 36 has the trouble, it is possible to prevent the output of the engine 10 from being excessively restricted to move the hydraulic excavator 1 from a working site to a maintenance location, performing necessary repair, replacement and maintenance.

On the other hand, the first, in a case where at step 3 it is determined that the pressure sensor 35 or 36 has a trouble by the processes of step 1 and step 3, or the second, in a case where it is determined that any of the sensors 28 to 34 and 37 to 39 other than the pressure sensors 35 and 36 has a trouble by the processes of step 1 and step 3 and it is determined that the particulate matter is excessively accumulated in the particulate matter removing filter 23 by step 6, the heavy degree of the operation restrictions (engine rotational speed restriction and fuel injection quantity restriction) is performed by the processes of steps 11 to 14. Therefore, it is possible to prevent excessive loads from being applied to the engine 10, the exhaust gas purifying device 20 and the regeneration device 24 or prevent the engine from being forcibly continuously operated.

In this case, since the engine 10 is stopped after the elapse of the predetermined time Ts by the processes of step 13 and step 14, it is possible to move the hydraulic excavator 1 from a working site before the predetermined time Ts elapses. As a result, necessary repair, replacement and maintenance can be performed in a state where the hydraulic excavator 1 is moved from a working site. In addition, by appropriately setting the predetermined time Ts, it is possible both to move the hydraulic excavator 1 from the working site and to prevent the engine 10 from being forcibly continuously operated.

It should be noted that in the aforementioned embodiments, each process of steps 1 and 3 shown in FIG. 4 is a concrete example of a trouble determining unit that is a required element in the present invention, the process of step 6 is a concrete example of an excessive accumulation determining unit, and each process of steps 7 to 14 shows a concrete example of an operation restricting unit.

In the aforementioned embodiments, a case of outputting the alarm to the operator by the alarming device 40 and of performing the rotational speed restriction of the engine 10 is exemplified as the light degree of the operation restrictions. In addition, the heavy degree of the operation restrictions is explained by taking a case of notifying to the operator by the alarming device 40, of performing the rotational speed restriction of the engine 10 and the fuel injection quantity restriction, and further, of stopping the engine 10 after the elapse of the predetermined time Ts as an example. However, the present invention is not limited to that, and for example, the light degree of the operation restrictions may be performed by giving the notification to the operator by the alarming device and the heavy degree of the operation restrictions may be performed by performing the rotational speed restriction of the engine and the fuel injection quantity restriction. That is, necessary operation restrictions can appropriately be selected corresponding to a detector in which a trouble has occurred, for example, the light degree of the operation restrictions comprising a warning level in which a warning is simply made to an operator and a regular work can continue to be performed, and the heavy degree of the operation restrictions comprising a level in which the work cannot continue to be performed, but the hydraulic excavator 1 can be traveled.

Each of the aforementioned embodiments is explained by taking a case of using the rotational sensor 28, the cooling water temperature sensor 29, the intake temperature sensor 30, the exhaust gas temperature sensors 31, 32, 33 and 34, the pressure sensors 35 and 36, and the opening degree sensors 37, 38 and 39 as the detectors forming the state detecting device 27 as an example. However, the present invention is not limited to that, and, for example, detectors such as an intake air flow quantity sensor for detecting an intake air quantity and an exhaust gas flow quantity sensor for detecting a flow quantity of an exhaust gas may be used. That is, as to the detectors forming the state detecting device, various types of detectors may be used as detectors for detecting the working states of the engine, the exhaust gas purifying device and the regeneration device. On the contrary, it is not necessary to use all the respective sensors 28 to 39 used in the embodiments, and the sensor other than the pressure sensors 35 and 36 may be provided as needed. Accordingly, for example, in a case where the oxidation catalyst 22 is not provided in the exhaust gas purifying device 20, the exhaust gas temperature sensor 32 may be omitted.

Each of the aforementioned embodiments is explained by taking a case where the exhaust gas purifying device 20 is configured by the oxidation catalyst 22 and the particulate matter removing filter 23 as an example. However, the present invention is not limited to that, and may be configured, for example, by combining a urea injection valve, a selective reduction catalyst device and the like in addition to the oxidation catalyst and the particulate matter removing filter.

Further, each of the aforementioned embodiments is explained by taking a case where the exhaust gas purifying device 20 is mounted on the small-sized hydraulic excavator 1 as an example. However, the construction machine provided with the exhaust gas purifying device by the present invention is not limited to that, and the exhaust gas purifying device 20 may be applied to a middle-sized or larger-sized hydraulic excavator. In addition, the exhaust gas purifying device 20 may widely be applied also to a construction machine such as a hydraulic excavator, a wheel loader, a fork lift, and a hydraulic crane that are provided with a wheel type lower traveling structure.

DESCRIPTION OF REFERENCE NUMERALS

1: Hydraulic excavator (Construction machine)
2: Lower traveling structure (Vehicle body)
4: Upper revolving structure (Vehicle body)
10: Engine
14: Fuel injection device
20: Exhaust gas purifying device
23: Particulate matter removing filter (Filter)
24: Regeneration device
27: State detecting device
28: Rotational sensor (Detector)
29: Cooling water temperature sensor (Detector)
30: Intake temperature sensor (Detector)
31: Front exhaust gas temperature sensor of throttle valve (Detector)
32: Front exhaust gas temperature sensor of catalyst (Detector)
33: Front exhaust gas temperature sensor of filter (Detector)
34: Rear exhaust gas temperature sensor of filter (Detector)
35, 36: Pressure sensor (Differential pressure detector)
37: Intake throttle valve opening degree sensor (Detector)
38: Exhaust throttle valve opening degree sensor (Detector)
40: Alarming device
41: Control device

The invention claimed is:

1. A construction machine comprising:
a vehicle body in which an operator sits;
an engine that is mounted on said vehicle body;
an exhaust gas purifying device that is provided in an exhaust side of said engine and traps particulate matter in an exhaust gas discharged from said engine by a filter;
a regeneration device that burns the particulate matter trapped in said filter to execute regeneration treatment of said filter;
a state detecting device formed of a plurality of kinds of detectors for detecting working states of said engine, said exhaust gas purifying device and said regeneration device; and
a control device for performing control of said engine and said regeneration device based upon a detection value of each of the detectors forming said state detecting device,
wherein said state detecting device includes differential pressure detectors for detecting a differential pressure that is a difference between a pressure in an inlet side and a pressure in an outlet side of said filter in said exhaust gas purifying device, and
wherein said control device comprises:
a trouble determining unit configured to determine whether any of said differential pressure detectors forming said state detecting device has a trouble or a detector other than said differential pressure detectors has a trouble;
an excessive accumulation determining unit configured to determine whether or not the particulate matter is excessively accumulated in said filter based upon the differential pressure detected by said differential pressure detectors in a case where it is determined that said detector other than said differential pressure detectors has the trouble by said trouble determining unit; and
an operation restricting unit configured to, in a case where it is determined that said detector has the trouble by said trouble determining unit, and/or it is determined that the particulate matter is excessively accumulated in said filter by said excessive accumulation determining unit, alarm an operator of the trouble and/or restrict output of said engine.

2. The construction machine according to claim 1, wherein said operation restricting unit performs a light degree of operation restrictions in a case where it is determined that said detector other than said differential pressure detectors has the trouble by said trouble determining unit and in a case where it is determined that the particulate matter is not excessively accumulated in said filter by said excessive accumulation determining unit, and performs a heavy degree of operation restrictions heavier than said light degree of the operation restrictions in a case where it is determined that any of said differential pressure detectors has the trouble by said trouble determining unit or in a case where it is determined that the particulate matter is excessively accumulated in said filter by said excessive accumulation determining unit.

3. The construction machine according to claim 2, wherein said light degree of the operation restrictions alarms an operator of the trouble, and performs a rotational speed restriction of said engine, and said heavy degree of the operation restrictions alarms the operator of the trouble, and performs the rotational speed restriction of said engine and a fuel injection quantity restriction.

4. The construction machine according to claim 1, wherein in a case where it is determined that any of said differential pressure detectors has the trouble by said trouble determining unit or in a case where it is determined that the particulate matter is excessively accumulated in said filter by said excessive accumulation determining unit, said operation restricting unit stops said engine when a preset predetermined time elapses.

5. The construction machine according to claim 1, wherein said differential pressure detectors among the detectors forming said state detecting device comprise a pair of pressure sensors for detecting pressures in an inlet side and an outlet side of said filter, wherein said detector other than said differential pressure detectors among said detectors forming said state detecting device comprises at least one of a rotational sensor for detecting a rotational speed of said engine, a cooling water temperature sensor for detecting a temperature of cooling water of said engine, an intake temperature sensor for detecting a temperature of air sucked into said engine, an exhaust gas temperature sensor for detecting a temperature of an exhaust gas, and an opening degree sensor for detecting an opening degree of a throttle valve for throttling an intake or exhaust gas flow passage.

* * * * *